E. A. JACKSON.
CATTLE GUARD.
APPLICATION FILED MAY 3, 1911.
1,010,368.
Patented Nov. 28, 1911.
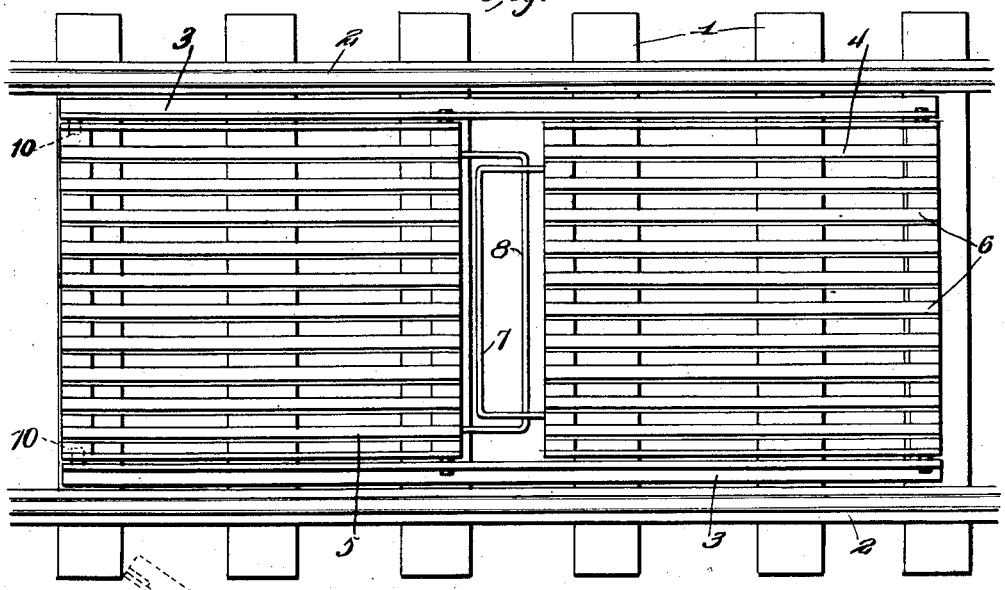
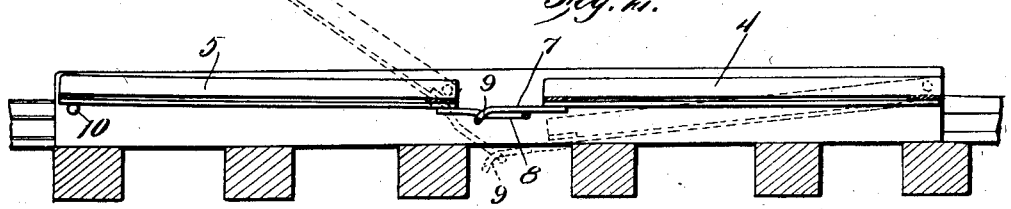
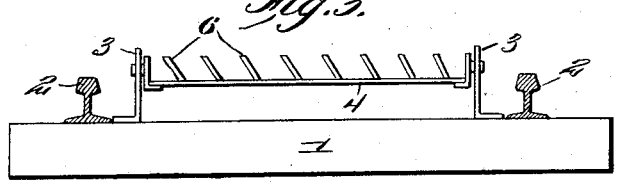
Inventor
Edward A. Jackson
Witnesses
By Victor J. Evans
Attorney

UNITED STATES PATENT OFFICE.

EDWARD A. JACKSON, OF CARNEGIE, MANITOBA, CANADA.

CATTLE-GUARD.

1,010,368.  Specification of Letters Patent.  Patented Nov. 28, 1911.

Application filed May 3, 1911. Serial No. 624,708.

*To all whom it may concern:*

Be it known that I, EDWARD A. JACKSON, a subject of the King of Great Britain, residing at Carnegie, Canada, have invented new and useful Improvements in Cattle-Guards, of which the following is a specification.

This invention relates to cattle guards, and the object of the invention is to provide a simple, cheap and efficient structure which will effectually prevent animals passing along the road from trespassing upon the property of the rail-road.

The invention consists in a pivoted platform, a pivoted gate which is operated by the depression of the platform when subjected to the weight of an animal so that a barrier is raised up in front of the animal which prevents him from proceeding farther.

Other objects of the invention will appear as the following specific description is read in connection with the accompanying drawings which form a part of this application and in which;

Figure 1 is a top plan view. Fig. 2 is a detail longitudinal section showing the normal position of the platform and gate in full lines and showing in dotted lines the operated position. Fig. 3 is a detail vertical section showing the parts in end elevation.

Referring more particularly to the drawings 1 represents the ties and 2 the track rails mounted thereon. Extending parallel with the rails and mounted upon the ties 1 are L irons 3 which are separated and have pivoted between them the platform frame 4 and the gate frame 5 the latter practically forming a continuation of the former. Both the platform frame 4 and the gate frame 5 have mounted thereon the guard bars 6 which are set on edge arranged as usual in parallel relation with the tracks, being separated a sufficient distance to form a surface over which it is difficult to walk.

The frame 4 is pivoted at one end to the L irons 3, and at its opposite end is provided with a yoke shaped arm 7 which extends outwardly from the frame and rests upon a similar arm 8 carried by the pivotal end of the gate. The arm 8 is slightly inclined so as to engage the arm 7 and hold the free end of the platform slightly inclined while the arm 7 has one end turned outwardly so as to form a shoulder 9 so as to engage the connecting part of the arm 8 and serve to limit the downward movement of the frame and prevent the gate from being thrown entirely over. Suitable stops 10 are carried by the L irons so as to support the free end of the gate when in normal position and these stops are so arranged that the gate will be slightly inclined from its pivotal point.

When a stray animal wanders on to the platform the free end is depressed and the arm 7 acts upon the arm 8 to depress the same thereby raising the free end of the gate, which acts as a barrier to further progress of the animal. If the animal happens to be going off the property no operation of the parts takes place until weight is applied to the free end of the platform, when this is done the gate will rise and will expedite his departure.

Having thus described the invention, what I claim is:—

A cattle guard comprising supporting members, a platform pivoted at one end between said supporting members, a gate pivoted at one end between said supporting members, a support for the free end of the gate which holds said gate inclined from the pivotal end, a yoke shaped arm projecting from the pivotal end of said gate, a yoke shaped arm projecting from the free end of said platform and resting upon the first named yoke arm to support the free end of the platform inclined from its pivotal point and shoulders formed on the last named yoke arm for engaging the first named yoke arm to limit the downward movement of the platform and the backward movement of the gate, the platform and gate being pivoted in a common plane.

In testimony whereof I affix my signature in presence of two witnesses.

EDWARD A. JACKSON.

Witnesses:
H. ARTHUR,
D. C. KYLE.

Copies of this patent may be obtained for five cents each, by addressing the "Commissioner of Patents, Washington, D. C."